TELEVISION SYNCH SIGNAL ERROR COMPENSATING CIRCUIT ARRANGEMENT

Filed Sept. 13, 1966

Inventors:
Winfried Horstmann
Gerhard Krause by Michael S. Striker
Attorney

Inventors:
Winfried Horstmann
Gerhard Krause by Michael J. Striker
Attorney

United States Patent Office 3,454,719

Patented July 8, 1969

3,454,719

TELEVISION SYNCH SIGNAL ERROR COMPENSATING CIRCUIT ARRANGEMENT

Winfried Horstmann and Gerhard Krause, Darmstadt, Germany, assignors to Fernseh GmbH., Darmstadt, Germany Filed Sept. 13, 1966, Ser. No. 579,091
Claims priority, application Germany, Sept. 16, 1965, F 47,199
Int. Cl. H04i 7/00
U.S. Cl. 178—69.5 6 Claims

ABSTRACT OF THE DISCLOSURE

A television signal, including a synch signal is applied to time delay means which have a plurality of time delay stages connected in series. Comparator means at each stage compare the time relationship of the television synchronizaton signal and a reference synch signal. The television signal is transferred to an output from that stage of the time delay stages at which the timing of the synchronization signal of the television signal coincides most closely to that of the reference synch signals. If the signal level at a determined point of the circuit, for example the output, is not within normal limits, a control signal is generated which causes the television signal to be transferred from that stage of the time delay means from which the last preceding transfer was made.

The present invention relates to a television error compensating circuit arrangement. More particularly, the inventon relates to a television synch signal error compensating circuit arrangement.

Synch or time signal errors in a television system may be compensated by incrementally delaying a television signal in time in a plurality of series connected delay lines. A comparator at each of the delay lines compares the synch signals of the television signal with a train of reference synch signals. The television signal at that time delay stage at which the corresponding comparator indicates a minimum time difference or error between the television synch signals and the reference synch signals is then transferred from such time delay stage to an output. The aforedescribed arrangement functions satisfactorily as long as the television signal is not distorted and does not vary or fluctuate heavily in amplitude. When the television signal is distorted and fluctuates heavily in amplitude, as is usual when such signal is read out from a magnetic storage, the transfer of the television signal from the wrong time delay stage may occur and may distort the television picture produced by such television signal. Thus, for example, when the amplitude of the television signal decreases so considerably that the comparator does not respond to the synch signals of such television signal, the television signal at the corresponding time delay stage is usually not transferred to the output during the corresponding comparison period. On the other hand, distorted synch signals of the television signal may cause the transfer, to the output, of the television signals at a plurality of corresponding time delay stages; such television signals being displaced in phase relative to each other and superimposed upon one another.

The principal object of the present invention is to provide a new and improved television synch signal error compensating circuit arrangement. The television synch signal error compensating circuit arrangement of the present invention prevents the erroneous transfer of television signals caused by distortion of the television signal or fluctuation of its amplitude thereby preventing distortion of the television picture. The circuit arrangement of the present invention operates with efficiency, effectiveness and reliability.

In accordance with the present invention, a television synch signal error compensating circuit arrangement comprises an incremental time delay comprising a plurality of time delay stages connected in series. A television signal including television synch signals is supplied to the incremental time delay for incrementally increasing delay in time in the time delay of the television signal. A plurality of comparators is provided, each connected to a corresponding one of the time delay stages of the the time delay for comparing the relation in time of the television synch signal of the television signal at the corresponding time delay stage and a reference synch signal. A train of reference synch signals is supplied to each of the plurality of comparators. An output is connected to each of the comparators and transfers the television signal at that time delay stage of the time delay at which the corresponding comparator indicates a minimum time difference between the television synch signals and the reference synch signals. A control circuit connected between the output and each of the comparators senses the signals in the output and prevents the transfer of a television signal from a time delay stage of the time delay and causes the transfer of a television signal from the time delay stage from which the next-preceding transfer was made upon the occurrence in the output of a zero signal or a resultant signal comprising television signals from at least two of the time delay stages of the time delay.

In order that the invention may be readily carried into effect, it will now be described with reference to the accompanying drawings, wherein.

Figure 1:
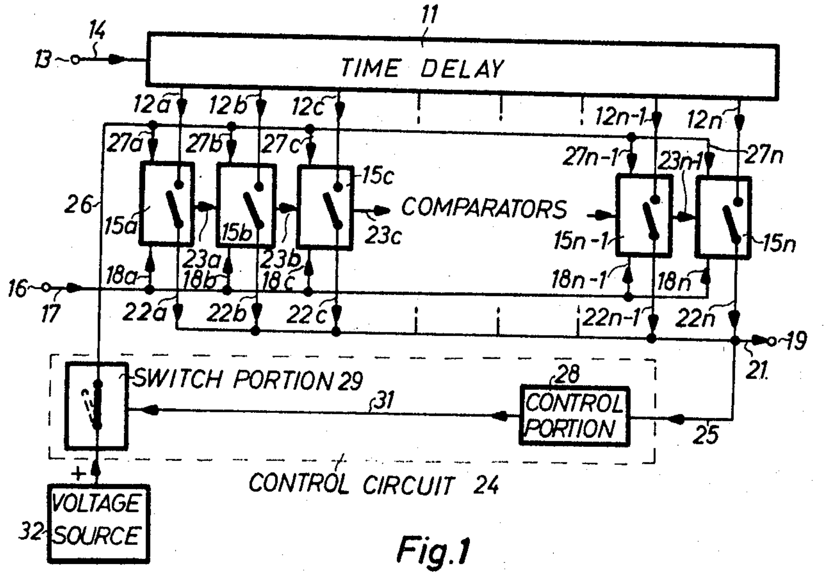
FIG. 1 is a block diagram of an embodiment of the television signals from at least two of the ime delay stages ment of the present invention.

In FIG. 1, an incremental time delay 11 comprises a plurality of time delay stages connected in series or a continuous delay line having a plurality of tap points or outlets, one at each time delay stage. The time delay 11 thus has a plurality of time delay stages 12_a_, 12_b_, 12_c_ . . . 12_n_–1, 12_n_.

A television signal including television synch signals is supplied to the incremental time delay 11 via an input terminal 13 and a lead 14. The television signal is incrementally increasingly delayed in time in the time delay 11.

A plurality of comparators 15_a_, 15_b_, 15_c_ . . . 15_n_–1, 15_n_ are connected to the time delay 11. The comparator 15_a_ has a first input connected to the time delay stage 12_a_, the comparator 15_b_ has a first input connected to the time delay stage 12_b_, the comparator 15_c_ has a first input connected to the time delay stage 12_c_, the comparator 15_n_–1 has a first input connected to the time delay stage 12_n_–1 and the comparator 15_n_ has a first input connected to the time delay stage 12_n_.

A train of reference synch signals is supplied to each of the comparators 15_a_ to 15_n_ via an input terminal 16, a lead 17 and leads 18_a_, 18_b_, 18_c_ . . . 18_n_–1, 18_n_. The leads 18_a_, 18_b_, 18_c_ . . . 18_n_–1, 18_n_ are connected to a second input of the comparators 15_a_, 15_b_, 15_c_ . . . 15_n_–1, 15_n_, respectively.

Each of the comparators 15_a_ to 15_n_ may comprise any suitable comparison circuit. A suitable comparison or comparator circuit is that shown in FIG. 3 and described with reference to FIG. 3. The comparators 15*a* to 15*n* are identical. The television signals supplied to the input terminal 13 are provided by any suitable source of television signals. The reference synch signals supplied to the input terminal 16 are provided by any suitable source of reference synch signals.

An output terminal 19 is connected to the output of each of the comparators 15*a* to 15*n* via a lead 21 and leads 22*a*, 22*b*, 22*c* . . . 22*n*–1, 22*n*. Each of the comparators 15*a* to 15*n* compares the relation in time of the television synch signals of the television signal at the corresponding time delay stage to which it is connected and the reference synch signals supplied to its second input. That comparator which indicates a minimum time difference or error between the television synch signals and the reference synch signal closes a circuit from the corresponding time delay stage 12*a* to 12*n* to the output terminal 19 so that the television signal at that time delay stage is transferred via said output terminal. The circuit closing means of each of the comparators 15*a* to 15*n* is symbolically indicated by a switch although, as described with reference to FIG. 3, the circuit may be closed by an electronic switching device.

When the television signal is undistorted, it should be transferred via only one of the comparators 15*a* to 15*n*. This is insured by connecting each of the comparators 15*a* to 15*n* to the next-succeeding one of said comparators via leads 23*a*, 23*b*, 23*c* . . . 23*n*–1, so that when one of said comparators closes a circuit from the corresponding time delay stage to the output terminal it causes the other comparators to maintain open circuits between the time delay and said output terminal. This is necessary, because a comparison pulse has a duration which is at least equal to the time delay between adjacent time delay stages 12*a* to 12*n*, so that there may be a comparison pulse at adjacent comparators if the aforementioned interconnections via the leads 23*a* to 23*n*–1 are not made.

A control circuit 24 is connected between the lead 21 and a third input of each of the comparators 15*a* to 15*n* via leads 25 and 26 and leads 27*a*, 27*b*, 27*c* . . . 27*n*–1, 27*n*. Since the lead 21 is connected to the output terminal 19 and to the outputs of the comparators 15*a* to 15*n*, the control circuit 24 is also connected to said output terminal and said outputs. The control circuit include a control portion 28 and a switch portion 29 connected to said control portion via a lead 31.

The control portion 28 of the control circuit 24 senses the signal in the output lead 21 and functions as an error control by opening the switch portion 29 when the amplitude of said signal is above or below determined levels. Thus, if there are considerable variations in amplitude of the television signal or if the television signal is interrupted, none of the comparators 15*a* to 15*n* closes a circuit from the time delay 11 to the output terminal 19 and the signal in the output lead 21 is therefore zero. The zero signal is one of the determined signal conditions sensed and detected by the control circuit.

The other of the determined signal conditions sensed and detected by the control circuit is a resultant signal comprising television signals from at least two of the time delay stages of the time delay. This may be caused, for example, by a disturbing pulse in the television signal, which causes two of the comparators 15*a* to 15*n* to close circuits from the delay line 11 to the output lead 21 and thereby doubles the signal amplitude over the normal amplitude of the signal in the output lead 21.

When the control portion 28 of the control circuit 24 senses either of the aforedescribed abnormal signal conditions in the output lead 21, it produces a gating pulse which is supplied to the switch portion 29 via the lead 31. The control portion 28 may comprise any suitable control circuit which functions in the aforedescribed manner. A suitable control portion 28 of the control circuit 24 is that shown in FIG. 4.

The switch portion 29 of the control circuit 24 comprises a normally closed electronic switch which is connected between the third inputs 27*a* to 27*n* of the comparators 15*a* to 15*n* and a source of voltage 32 which provides the operating voltage for the circuit closing switches of said comparators. When the control portion 28 supplies a gating pulse to the swith portion 29, it opens said switch portion to prevent the operating voltage from being supplied by the voltage source 32 to the comparators 15*a* to 15*n* thereby preventing said comparators or any of them from transferring a television signal from the time delay 11 to the output lead 21. Furthermore, as described with reference to FIG. 4, the supply of a gating pulse to the switch portion 29 via the lead 31 causes the transfer of a television signal from the time delay stage from which the next-preceding transfer was made. This is accomplished by switching the comparators to the conditions they were in during the next-preceding transfer.

Figure 2:
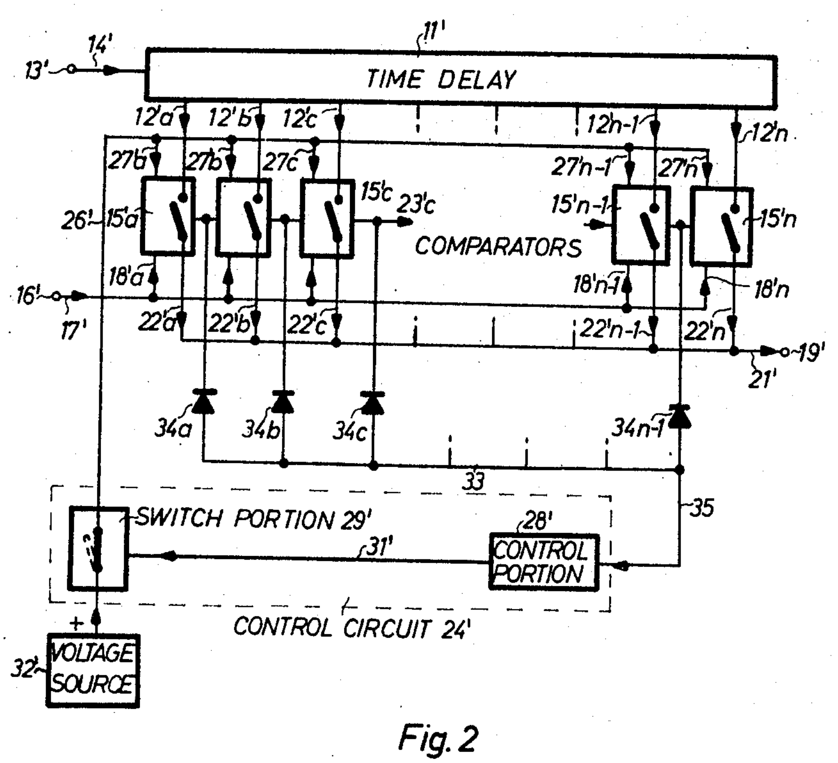
FIG. 2 is a modification of the embodiment of FIG. 1.

The modification of FIG. 2 is similar to the embodiment of FIG. 1, except that the control circuit 24′ senses the signal in a lead 33 instead of the output lead 21′. The blocking pulses supplied by each of the comparators 15′*a* to 15′*n* to the next-succeeding comparators, via the leads 23′*a* to 23′*n*, when one of said comparators closes a circuit from the delay line 11 to the output lead 21′, are supplied to the lead 33 via diodes 34*a*, 34*b*, 34*c* . . . 34*n*–1 which are connected to the leads 23′*a*, 23′*b*, 23′*c* . . . 23′*n*–1, 23′*n*, respectively. The control circuit 24′ is connected to the lead 33 by a lead 35. The operation of the modification of FIG. 2 is otherwise the same as the operation of the embodiment of FIG. 1.

Figure 3:
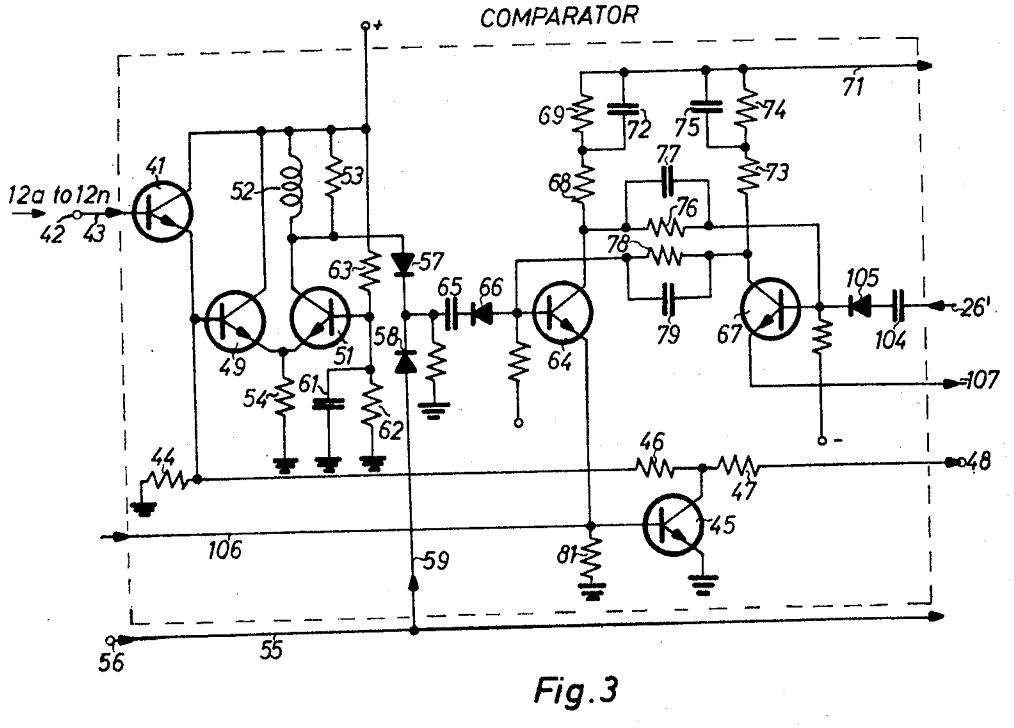
FIG. 3 is a circuit diagram of an embodiment of a comparator circuit which may be utilized in the circuit arrangements of FIGS. 1 and 2.

In the comparator circuit of FIG. 3, a television signal from one of the time delay stages 12*a* to 12*n* is supplied to the base electrode of a transistor 41 via an input terminal 42 and an input lead 43. The transistor 41 functions as an impedance converter. An emitter load resistor 44 is connected between the emitter electrode of the transistor 41 and ground. The emitter electrode of the transistor 41 is connected to the collector electrode of a switching transistor 45 via a resistor 46. The resistor 44 functions to compare the time relation of the television synch signals and the reference synch signals and the switching transistor 45 functions to close a circuit from the delay line to the output lead (FIG. 1).

When the transistor 45 is in its conductive condition, it short-circuits a signal at the junction or common point of the resistor 46 and a resistor 47 which is connected to the collector electrode of said transistor. The resistors 46 and 47 are connected in series between the emitter electrode of the transistor 41 and an output terminal 48. When the switching transistor 45 is in its non-conductive condition the signal is transferred to the output terminal 48 via the resistors 46 and 47.

The comparator includes a differentiating circuit comprising a pair of transistors 49 and 51 and an inductor 52. The base electrode of the transistor 49 is connected to the emitter electrode of the transistor 41. The collector electrode of the transistor 49 is connected to the collector electrode of the transistor 41. The inductor 52 is connected in parallel with a resistor 53 between the collector electrode of the transistor 51 and the collector electrode of the transistor 41. The emitter electrodes of the transistors 49 and 51 are connected to each other and are connected to ground via a resistor 54.

The differentiating circuit derives from the leading edges of the line synch pulses of the television signal a train of narrow pulses. A train of reference synch signals is supplied to a lead 55 via an input terminal 56 and the reference synch signals are supplied to an AND gate or circuit comprising diodes 57 and 58 via a lead 59. The narrow pulses provided by the differentiating circuit are supplied to the AND circuit 57, 58. The AND circuit 57, 58 compares the narrow pulses and the reference synch signals.

The signals to be differentiated are supplied to the base electrode of the transistor 49. The parallel connected inductor 52 and resistor 53 function as a load impedance of the transistor 51. The base electrode of the transistor 51 is maintained at a constant potential with regard to signal frequencies by a capacitor 61 which is connected between said base electrode and ground. The base electrode of the transistor 51 is maintained at a desired DC potential by resistors 62 and 63 which are connected in series between the positive pole of a DC voltage supply source and ground, with the base electrode of the transistor 51 connected to a common point in the connection between said resistors 62 and 63.

When the pulses compared by the AND circuit 57, 58 coincide, a potential difference occurs at a common point in the connection between the diodes 57 and 58. The potential is applied to the base electrode of a transistor 64 via a capacitor 65 and a diode 66 connected in series between the common point between the diodes 57 and 58 and said base electrode. The transistor 64 and a transistor 67 are connected to each other in a bistable multivibrator circuit.

The collector electrode of the transistor 64 is connected to the positive pole of a source of voltage supply (not shown) via a pair of series-connected resistors 68 and 69 and a lead 71. The resistor 69 is shunted by a capacitor 72. The collector electrode of the transistor 67 is connected to the lead 71 via a pair of series-connected resistors 73 and 74. The resistor 74 is shunted by a capacitor 65. The collector electrode of the transistor 64 is coupled to the base electrode of the transistor 67 via a parallel connection of a resistor 76 and a capacitor 77 and the collector electrode of the transistor 67 is coupled to the base electrode of the transistor 64 via a parallel connection of a resistor 78 and a capacitor 79.

The capacitors 72 and 75 function as a storage or memory. The pulse applied to the transistor 64 switches the bistable multivibrator or trigger circuit to its other stable condition and in turn controls the conductivity condition of the switching transistor 45 due to the variation of voltage across a resistor 81 connected between the emitter electrode of said transistor 64 and ground. The voltage across the resistor 81 is applied directly to the base electrode of the switching transistor 45.

Figure 4:
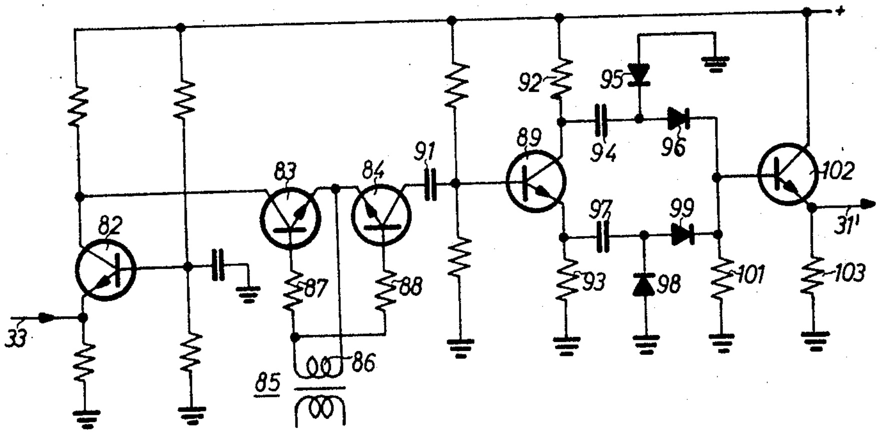
FIG. 4 is a circuit diagram of an embodiment of a control portion of a control circuit which may be utilized in the circuit arrangements of FIGS. 1 and 2.

In the control portion of the control circuit of FIG. 4, the lead 33 of FIG. 2 is connected to the emitter electrode of a transistor 82. The voltage on the lead 33 (FIG. 2) is applied via the transistor 82 to a gate circuit comprising a pair of transistors 83 and 84. Gate or control pulses are supplied to the gate circuit 83, 84 via a transformer 85. The emitter electrodes of the transistors 83 and 84 are connected to each other and to one end of the secondary winding 86 of the transformer 85. The other end of the secondary winding 86 of the transformer 85 is connected to the base electrode of the transistor 83 via a resistor 87 and to the base electrode of the transistor 84 via a resistor 88. The collector electrode of the transistor 83 is connected to the collector electrode of the transistor 82. The collector electrode of the transistor 84 is coupled to the base electrode of a transistor 89 via a capacitor 91.

The gate or control pulses supplied to the gate circuit 83, 84 by the transformer 85 commence shortly after the synch signal and terminate during the duration of the line synch pulses of the television signal. During the time that the gate circuit 83, 84 is in its conductive condition, due to the supply thereto of the control pulses by the transformer 85, the voltage on the lead 33 is applied to the base electrode of the transistor 89. Voltages then occur across a collector load resistor 92 and an emitter load resistor 93, connected to the collector electrode and emitter electrode, respectively, of the transistor 89.

The voltage across the collector load resistor 92 is applied via a capacitor 94 to a pair of diodes 95 and 96. The voltage across the emitter load resistor 93 is applied via a capacitor 97 to a pair of diodes 98 and 99. The diode pairs 95, 96 and 98, 99 rectify the applied voltages to provide a rectified voltage across a resistor 101 which is connected between the diodes 96 and 99 and ground. The voltage across the resistor 101 is applied to the base electrode of a transistor 102 which is connected as an emitter follower with an emitter load resistor 103 connected between the emitter electrode thereof and ground. The voltage across the emitter load resistor 103 is applied to the switch portion 29' (FIG. 2) via the lead 31' which is connected to the emitter electrode of the transistor 102.

If the current in the lead 33, and thus the voltage at the base electrode of the transistor 89, is either higher or lower than its usual or normal magnitude by a determined amount, a voltage variation is produced at the resistor 103 which briefly interrupts the operating voltage of the bistable multivibrator circuit 64, 67, etc. of the comparator (FIG. 3) by interrupting the voltage supply thereto via the lead 71 (FIG. 3).

When an error occurs, the direct voltage supply to the bistable multivibrator or trigger circuit of each of the comparators is interrupted in the aforedescribed manner. If, for example, the transistor 67 of FIG. 3 is conductive for the duration of one line, so that the capacitor 75 is charged to the voltage across the resistor 74, such a charge condition of said capacitor is not substantially varied by a possible switching of the stable condition of the trigger circuit and during the brief interruption of the operating voltage when an error occurs. This is due to the time from the switching of the condition of the trigger circuit to the trailing edge of the pulse which interrupts the operating voltage being small compared to the time constant of the resistance capacitance circuit 74, 75.

After the sensing or detection of an error condition at the termination of the time comparison operation of the comparators, the trigger circuits of the comparators are switched to the conditions in which they were prior to the application of a reset pulse via the lead 26' from the control circuit of FIG. 4. The interruption pulse is applied (FIG. 3) via the lead 26', a capacitor 104 and a diode 105 to the base electrode of the transistor 67.

If the reset pulse applied via the lead 26' is applied when the trigger circuit is in the reset condition, then, when the operating or supply voltage on the lead 71 is restored, the base electrode of the transistor 67 will conduct current, so that said transistor is switched to its conductive condition and the transistor 64 is switched to its non-conductive condition. The stable condition of the trigger or bistable multivibrator circuit prior to the application of the reset pulse is thus restored.

The emitter electrode of the transistor 67 (FIG. 3) is connected to a lead of the next-succeeding comparator corresponding to a lead 106 via a lead 107, so that when said transistor is in its conductive condition, the switching transistor 45 of the next-succeeding comparator is switched to its conductive condition and said next-succeeding comparator maintains an open circuit between the time delay 11' (FIGS. 1 and 2) and the output lead 21' (FIGS. 1 and 2). The lead 106 is connected to the base electrode of the switching transistor 45 (FIG. 3) from the lead 107 of the next-preceeding comparator.

While the invention has been described by means of specific examples and in specific embodiments, we do not wish to be limited thereto, for obvious modifications will occur to those skilled in the art without departing from the spirit and scope of the invention.

What we claim is:

1. A television synchronization signal error compensating circuit arrangement, comprising, in combination, incremental time delay means having a plurality of time delay stages connected in series; means for supplying a television signal including television synchronization signals occurring at line intervals to said incremental time delay means for incrementally increasing the time delay of said television signal; means for supplying a train of reference synchronization signals; an output; a plurality of comparator means each connected to a corresponding one of the time delay stages of said time delay means for comparing the relation in time of the television synchronization signal of said television signal at the corresponding time delay stage with said reference synchronization signals, and completing a conductive path between said corresponding time delay stage and said output when the corresponding comparator means indicates a determined time relation between said television synchronization signals and said reference synchronization signals; control means connected to said comparator means in such a manner that an error signal is generated when the number of said conductive paths between said time delay stages and said output is not equal to one; and means responsive to said error signal for interrupting any conductive paths established during the comparison resulting in said error signal, and re-establishing the conductive path established during the immediately preceding comparison.

2. A television synchronization signal error compensating circuit arrangement as claimed in claim 1, wherein said determined time relation between the television synchronization signals and the reference signals is a minimum time difference.

3. A television synchronization signal error compensating circuit arrangement as claimed in claim 1, wherein said control means is connected to said comparator means at said output; and wherein said error signal is generated if the signal level at said output is substantially less than or substantially greater than the level resulting from the transfer of a television signal from a single time delay stage.

4. An arrangement as set forth in claim 1 further comprising means for interrupting the conductive path of the adjacent time delay stage upon completion of the conductive path associated with a given time delay stage.

5. A television synchronization signal error compensating circuit arrangement as claimed in claim 1, wherein each of said comparator means further comprises signal storage means for storing a signal indicative of the previous state of the assocated conductive path for a predetermined time period after the subsequent comparison series, whereby the condition of the conductive path prior to said comparison may be restored upon occurrence of an error signal.

6. A television synchronization signal error compensating circuit arrangement as claimed in claim 5, wherein said comparator means each comprise a bistable multivibrator circuit including a pair of interconnected transistors each having a collector electrode; wherein said storage means comprise a resistance-capacitance time constants circuit connected to the collector electrode of each of said transistors; wherein said comparator means each further comprise means for furnishing a supply voltage to each of said collector electrodes via the corresponding time constant circuit connected thereto; wherein the corresponding conductive path is completed when said bistable multivibrator circuit is in a first state; wherein said means responsive to said error voltage comprise means for disconnecting said supply voltage from all of said collector electrodes for a disconnect time short with respect to the time constant of said storage means upon receipt of an error signal and reapplying said supply voltage after said disconnect time, whereby each of said bistable multivibrator circuits will reassume the state determined by the signals stored in said resistance capacitance time constant circuit.

References Cited

UNITED STATES PATENTS 3,141,926 7/1964 Newell ------------- 178—5.4

RICHARD MURRAY, *Primary Examiner.*

ROBERT L. RICHARDSON, *Assistant Examiner.*

U.S. Cl. X.R.

328—56